United States Patent [19]

Wernimont et al.

[11] Patent Number: 5,449,194
[45] Date of Patent: Sep. 12, 1995

[54] OPERATOR CONTROLLED VEHICLE STABILIZER

[75] Inventors: Theodore A. Wernimont; Timothy Schroering; Gerald L. Piper, all of Winona, Minn.

[73] Assignee: Badger Equipment Company, Winona, Minn.

[21] Appl. No.: 330,439

[22] Filed: Oct. 28, 1994

Related U.S. Application Data

[60] Division of Ser. No. 124,940, Sep. 21, 1993, Pat. No. 5,388,857, which is a continuation-in-part of Ser. No. 936,129, Aug. 27, 1992, abandoned.

[51] Int. Cl.⁶ .................. B60G 17/005; B60G 25/00
[52] U.S. Cl. ........................... 280/708; 280/714; 280/754; 280/755
[58] Field of Search ............... 280/754, 755, 714, 772, 280/6.12, 702, 708, 709, 710; 212/189

[56] References Cited

U.S. PATENT DOCUMENTS

| | | | |
|---|---|---|---|
| 3,958,813 | 5/1976 | Carey | 280/755 |
| 4,145,073 | 3/1979 | McLuckie | 280/714 |
| 4,152,004 | 5/1979 | Schroder | 280/714 |
| 4,174,854 | 11/1979 | Spicka et al. | 280/754 |
| 4,264,014 | 4/1981 | Hogg et al. | 280/754 |
| 4,382,604 | 5/1983 | Nakagawa | 280/714 |
| 4,705,295 | 11/1987 | Fought | 280/754 |
| 4,951,767 | 8/1990 | Keagbine | 280/772 |

FOREIGN PATENT DOCUMENTS

| | | | |
|---|---|---|---|
| 2852600 | 6/1979 | Germany | 280/755 |
| 58-183307 | 10/1983 | Japan | 280/754 |
| 2040839 | 9/1980 | United Kingdom | 280/714 |

*Primary Examiner*—Kenneth R. Rice
*Assistant Examiner*—Peter C. English
*Attorney, Agent, or Firm*—Baker & Daniels

[57] ABSTRACT

An apparatus for stabilizing a material handling vehicle which enables or disables a vehicle's suspension system. Pilot-to-open check valves are mounted on hydraulic cylinders secured between the axle and frame of the vehicle. In a first embodiment, a pneumatically actuated check valve is opened or closed to permit or prevent fluid communication between the hydraulic cylinders. The absence of pneumatic pressure in the pneumatic circuit causes the check valves to close, thereby locking the axle to the frame for stability. The presence of pneumatic pressure in the circuit opens the check valves to permit fluid communication between the cylinders. In an alternative embodiment, a second electro-hydraulic circuit is provided in place of the pneumatic circuit for opening and closing pilot-to-close check valves mounted on the hydraulic cylinders.

2 Claims, 7 Drawing Sheets

5,449,194

OPERATOR CONTROLLED VEHICLE STABILIZER

This is a division of application Ser. No. 08/124,940, filed Sep. 21, 1993, U.S. Pat. No. 5,388,857, which is a continuation-in-part of application Ser. No. 07/936,129, filed Aug. 27, 1992, abandoned.

BACKGROUND OF THE INVENTION

The present invention relates generally to mobile material handling machines that are used to lift and place material, and more particularly, to such a machine having a device for stabilizing the machine during manipulation of its material handling implement.

Mobile mounted material handling machines such as cranes, forklifts, and excavators have been manufactured with and without suspension systems. Machines with suspension systems are more suitable for driving to the worksite because they permit at least one axle or tire set to oscillate relative to the vehicle frame when driving over uneven terrain. While this suspension improves the quality of ride and reduces frame stresses, it also limits the lateral stability of the machine when lifting material transverse to its longitudinal axis. Machines without suspension systems are more suitable to resist the overturning forces when lifting material transverse to their longitudinal axis because the outboard end of the axle can resist the overturning loads on the machine.

To overcome this inherent stability deficiency of machines with suspension systems, manufacturers have incorporated vehicle stabilizers that can be positioned external to the wheelbase of the machine when the machine is handling material. More recently, manufacturers have utilized hydraulic cylinders to control and limit the movement of suspension systems, thereby increasing the transverse stability of the machine, when it is used for handling material.

In U.S. Pat. No. 4,174,854, a vehicle stabilizing apparatus is described and includes both "spring" and "locking" cylinders, levelling valves and other related hardware to select between a rigid and "floating" suspension system. In U.S. Pat. No. 4,705,295, a vehicle stabilizing system is disclosed that requires air to be present to lock the suspension system in its most stable condition. This method of locking the suspension system is potentially dangerous because loss of air pressure due to a leak or broken air line could cause the vehicle to lose its "locked" condition and cause the vehicle to overturn and cause personal injury and/or property damage.

It is desired to eliminate this inherently dangerous condition by using a valving arrangement that locks the axle and machine in its most stable configuration without the requirement of air pressure in the pneumatic lines. It is further desired to provide a hydraulically actuated locking suspension system.

SUMMARY OF THE INVENTION

The present invention, in one form thereof, provides a vehicle suspension system that is applicable to either spring mounted axles or oscillating axles that support vehicle frames. A hydraulic cylinder is installed near each end of the axle, and hydraulic fluid is provided to each cylinder via a pressure reservoir, hydraulic lines and a pilot-to-open check valve. The pilot-to-open check valve is ideally located on the cylinder to prevent loss of hydraulic fluid if a line is broken, thereby causing loss of fluid from the cylinders and unlocking the axle. Control of the check valve is provided by means of air pressure. Applying air pressure to the pilot-to-open check valve causes the fluid in the cylinders to be in communication with the hydraulic reservoir which is pressurized by system air pressure. In this condition, the axle is free to oscillate and follow the terrain. Removing the air pressure closes the pilot-to-open check valves on the hydraulic cylinders, which traps incompressible fluid within the cylinders, thereby locking the cylinders. This is accomplished when the operator shifts a control valve in the transport operator's cab before the operator relocates to the excavator operator's station. Shifting this control valve in the transport operator's cab could also engage the vehicle's brakes, thereby making it stationary.

When the machine is operated from the excavator operator's station, actuation of the travel levers (or pedals) to reposition the machine causes the vehicle's brakes to be released. The vehicle is configured to simultaneously apply air pressure to the pilot-to-open check valves on the cylinders. This opens the valves on the cylinders and allows fluid to be in communication with a hydraulic reservoir, thereby allowing the axle to "float" relative to the frame. When the travel levers/pedals are in the neutral position, air in the pneumatic lines is vented to the atmosphere, and the vehicle's brakes automatically reset, and the cylinders are again locked.

A means of bypassing the automatic unlocking is provided by a separate switch and control valve, which connects the pilot-to-open check valves to the atmosphere while the brakes are released on the vehicle. This feature allows the operator to lift a heavy load and transport it a short distance over relatively level terrain with the increased stability of the locked suspension. As stated earlier, loss of air pressure during this critical maneuver will not affect the locking or stability of the machine.

In an alternative embodiment, an electro-hydraulic system is provided to actuate the axle lockout device. In this embodiment, a first hydraulic circuit is provided for causing the fluid in the cylinder to be in communication with a pressurized hydraulic reservoir. A second hydraulic circuit is in selective communication with either a hydraulic reservoir at atmospheric pressure or a source of pressurized hydraulic fluid. An electrical circuit including a solenoid valve is provided for shifting the spool or movable part of the solenoid valve to vary the hydraulic pressure within the second hydraulic circuit. The second hydraulic circuit actuates and deactuates the pilot-to-close check valves mounted on the cylinders for enabling or preventing fluid communication between the cylinders.

DESCRIPTION OF THE PREFERRED EMBODIMENTS

Figure 1:
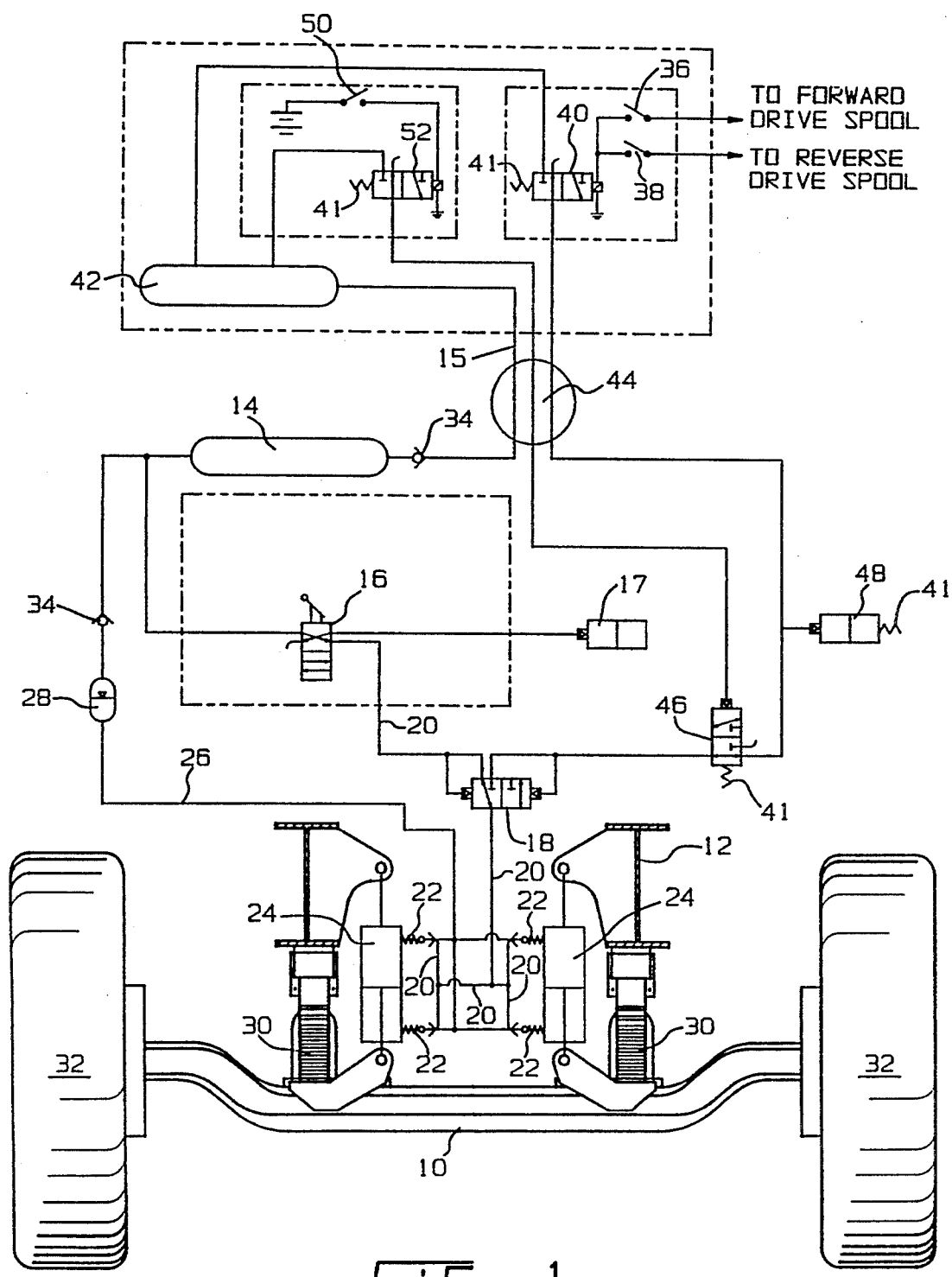
FIG. 1 is a partial front elevational view of a mobile material handling machine schematically showing various components of an embodiment of the present invention, and in particular, showing the machine in its "transport" mode with the axle free to move relative to the frame.

In an exemplary embodiment of the present invention, FIG. 1 shows a mobile material handling machine, wherein the control valves are in a position to permit the spring supported axle 10 to move relative to frame 12 as the vehicle is being driven. Air pressure in reservoir 14 is directed through remote drive selector valve 16, air operated shuttle valve 18, and air lines 20 to open four pilot-to-open check valves 22 mounted on cylinders 24. Pilot-to-open check valves 22 are ideally connected directly to ports on the cylinders 24 to prevent loss in stability if hydraulic lines 26 are broken. Incompressible hydraulic fluid is then free to flow via line 26 between cylinders 24 and air-charged hydraulic reservoir 28 and allows springs 30 to deflect and permit both wheels 32 to be in contact with the ground.

Figure 2:
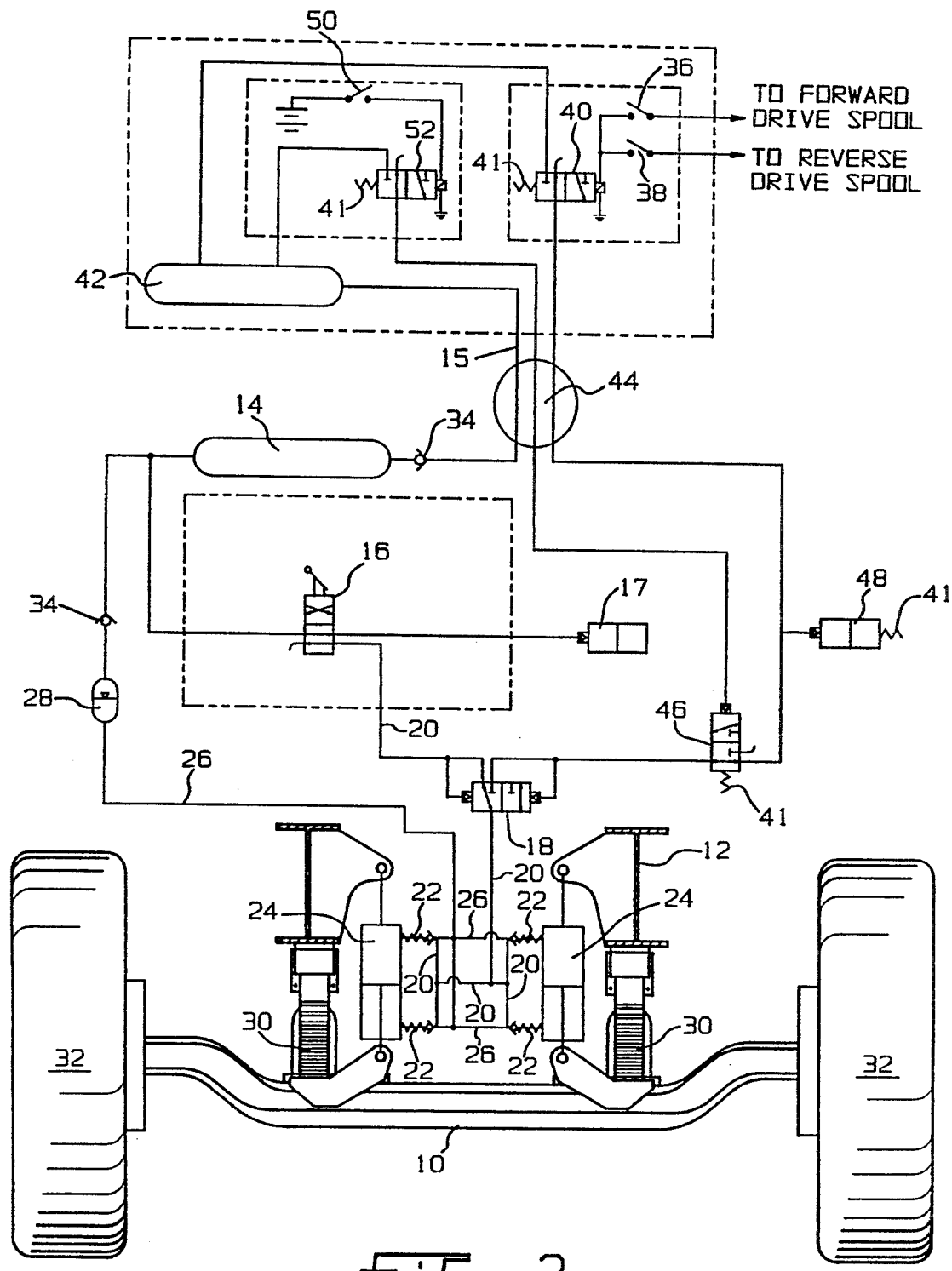
FIG. 2 is a view of the machine of FIG. 1, particularly showing the system in its "excavate mode" after the operator has positioned the selector valve in the transport cab to the "remote" operator position and before the pilot operated shuttle valve has shifted.

When the vehicle reaches the work site, the operator shifts the remote drive selector valve 16 to the "engaged" position as shown in FIG. 2. Valve 17 is an air pilot operated air control valve that engages and disengages the remote drive power take off (not shown). Air operated shuttle valve 18 remains in the same position as shown in FIG. 1 until air pressure is provided from the upperstructure air circuit. Air pressure that held pilot-to-open check valves 22 in the open position is exhausted to the atmosphere through air lines 20, pilot operated shuttle valve 18, and remote drive selector valve 16. The loss of pilot pressure in the four pilot-to-open check valves 22 causes them to close, thereby hydraulically locking the cylinders 24 and axle 10 to frame 12 which provides maximum vehicle stability during excavation.

Figure 3:
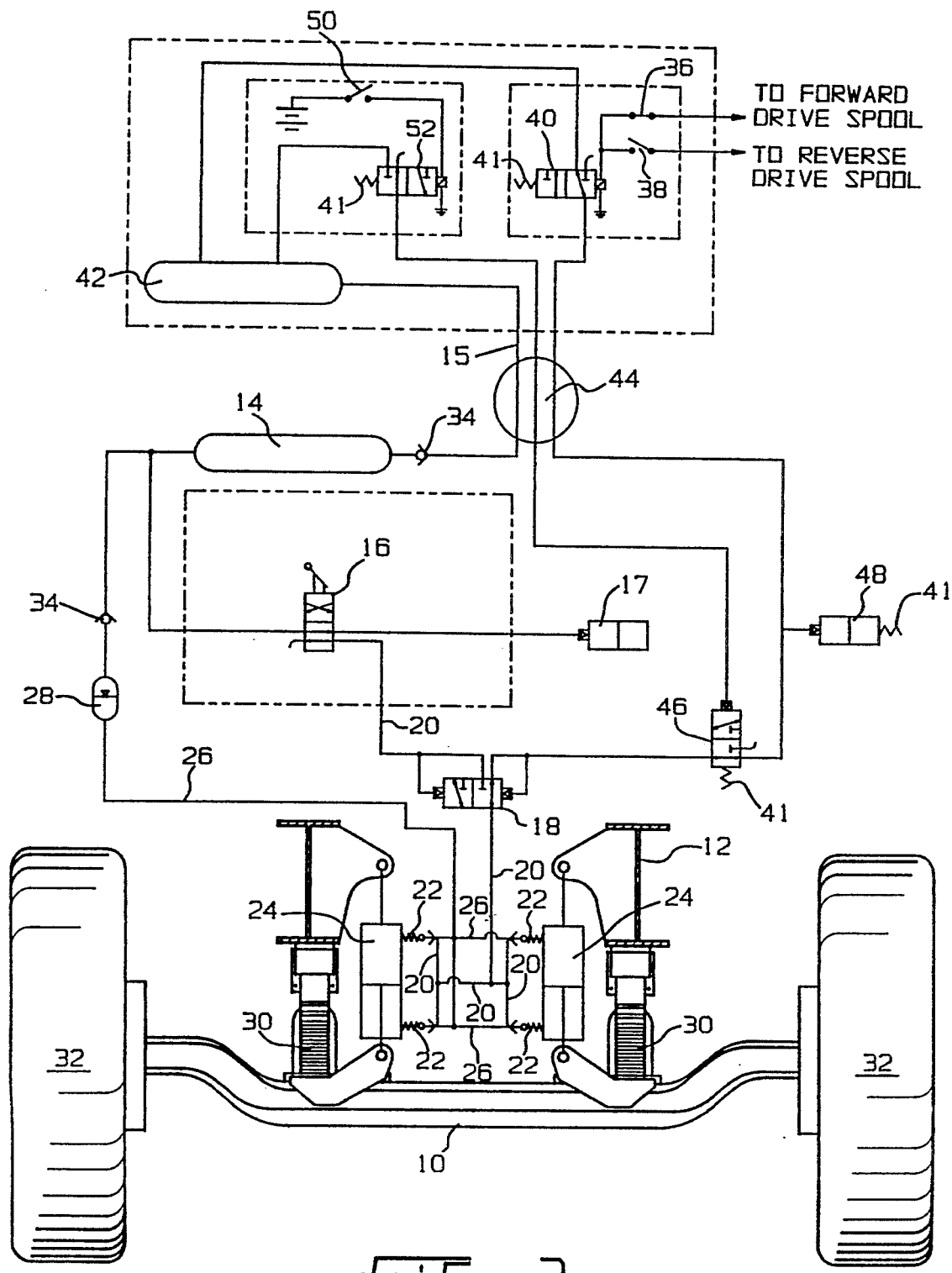
FIG. 3 is a view of the machine of FIG. 1, particularly showing the system in its "excavate mode" with the axle automatically released each time the travel function is utilized.

As part of performing the normal excavating process, the operator is required to reposition the machine using the excavator cab controls. During this maneuver, it may be desirable to permit axle 10 to oscillate with respect to frame 12 and allow wheels 32 to follow the contour of the work site. This feature is achieved by incorporating pressure actuated electrical switches 36 and 38 into the forward and reverse directional controls of the machine. Closing either switch 36 and 38 (these could be combined into a single switch) causes an electric solenoid operated air control valve 40 to shift and directs air from an upper air reservoir 42 through an air swivel 44 and an air pilot operated air control valve 46 to shuttle valve 18, which is then shifted to the position shown in FIG. 3. Pilot-to-open check valves 22 are opened, thereby hydraulically connecting cylinders 24 to the air-charged hydraulic reservoir 28 and permitting axle 10 to move relative to frame 12. Springs 41 are provided to offset their respective control valves to their de-energized positions.

Upper reservoir 42 is charged by an air compressor (not shown) that is mounted on the upperstructure engine. Lower reservoir 14 is charged by an air compressor (not shown) that is mounted on the carrier engine. Air line 15 permits air pressure to flow from reservoir 42 to reservoir 14. Check valve 34 in line 15 prevents air pressure from flowing back from reservoir 14 to reservoir 42. Check valve 34 in line 15 also permits the upper air compressor to charge the lower air reservoir without the carrier engine running. Air swivel 44 is preferably a rotary coupling that allows air pressure to be communicated between the upper and lower assemblies. Swivel 44 permits continuous rotation of the upperstructure with respect to the undercarriage.

Air control valve 46 is actuated by an air pressure supply which is directed by an electric solenoid operated air control valve 52 located on the upperstructure. Air control valve 52 is controlled by a toggle switch 50 mounted in the upperstructure cab. The operator manually controls toggle switch 50 to select the lockout system which may either function automatically or be locked for "pick and carry."

Brake release valve 48 is an air pilot operated air control valve that is controlled by air pressure directed from air control valve 40. Air control valve 40 is actuated by pressure switches 36 and 38, which themselves are automatically actuated whenever the remote drive control valve is actuated in either the forward or reverse directions. Actuation of brake release valve 48 releases the vehicle's brake(s) and permits the vehicle to move. When the operator has completed the vehicle move, switches 36 and 38 are automatically opened and solenoid valve 40 shifts to connect the pilot-to-open check valves 22 to atmosphere, thereby locking the position of cylinders 24 and axle 10 relative to frame 12, and brake release valve 48 shifts to reset the vehicle's brakes.

Figure 4:
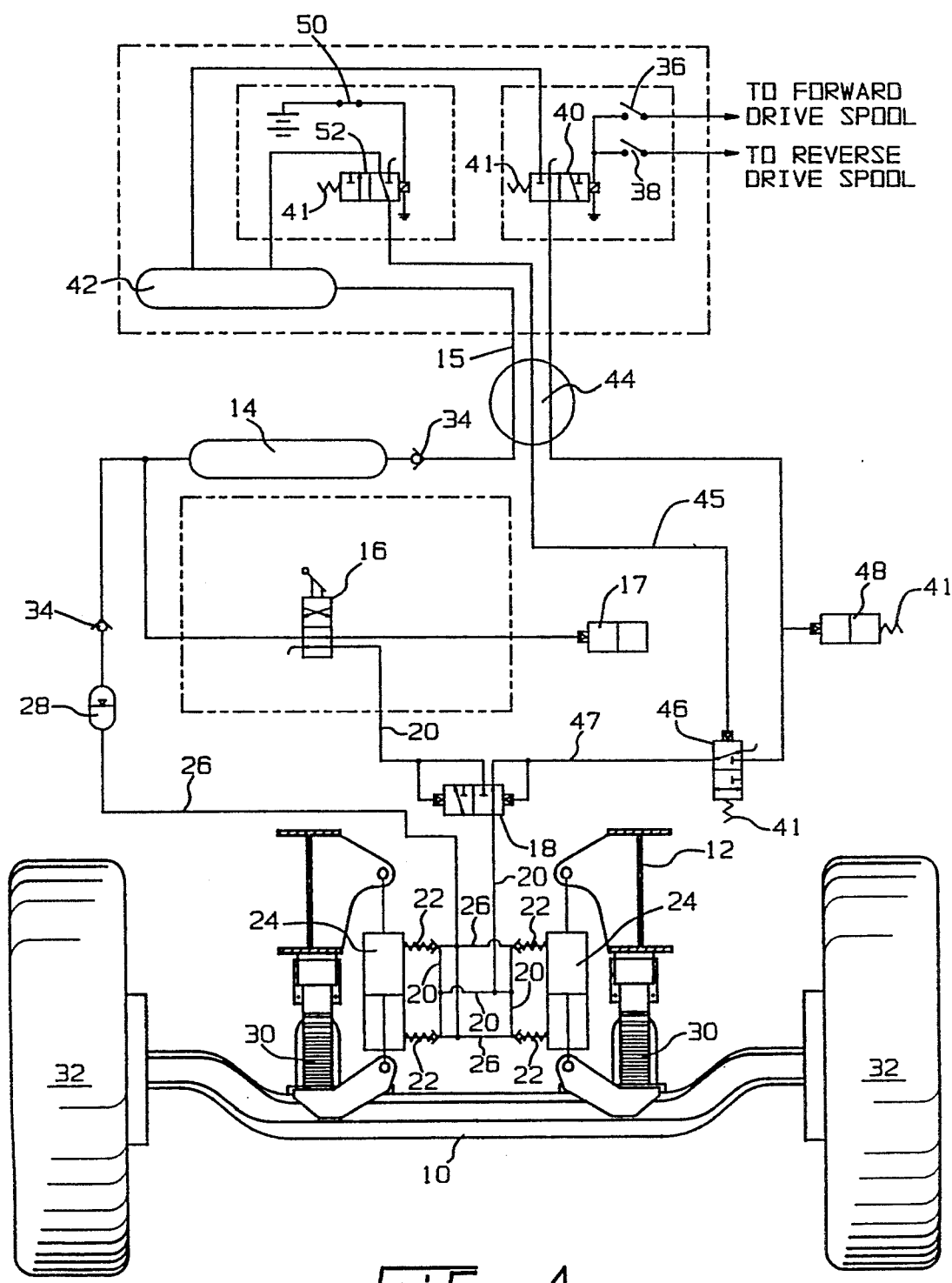
FIG. 4 is a view of the machine of FIG. 1, particularly showing the system in its "excavate mode" with the automatic axle release being overridden by the operator selecting a locked axle mode.

To transport a heavy load over a level surface, the operator can bypass the automatic axle release system and lock the axle to the frame by closing electrical switch 50 as shown in FIG. 4. Air control valve 52 is then shifted, and air pressure from upper reservoir 42 is directed to the pilot section of selector valve 46 via swivel 44. Pilot operated selector valve 46 shifts and releases pressure on pilot-to-open check valves 22, which locks cylinders 24 and rigidly fixes axle 10 relative to frame 12 to provide maximum vehicle stability. The operator can return to the automatic mode by opening electrical switch 50.

The operation of the pilot-to-open check valves 22 can also be controlled by using electrically operated valves in lieu of air operated valves 46 and 48. For example, an electrical collector ring rather than an air swivel 44 may be used to provide electrical communication between the upperstructure cab and lower chassis. Air pressure from air reservoir 14 can also be used in lieu of air from air reservoir 42 to open the pilot-to-open check valves 22, if electrically controlled valves are used in lieu of air operated valves 46 and 48.

The system as proposed has several fail-safe features that improve its dependability and reliability. In the event of a leak or fracture in any air line, air pressure in the line would be exhausted to the atmosphere, thereby closing pilot-to-open check valves 22 and locking the axle 10 in a rigid position relative to frame 12. This is particularly important when handling loads, wherein vehicle stability is dependent on the axle being rigidly connected to the frame. Additional fail-safe means are provided by electrically operated air control valves 40 and 52, which shift to the axle "locking" position in the event of an electrical power loss by mechanical offset springs incorporated into their design.

Figure 5:
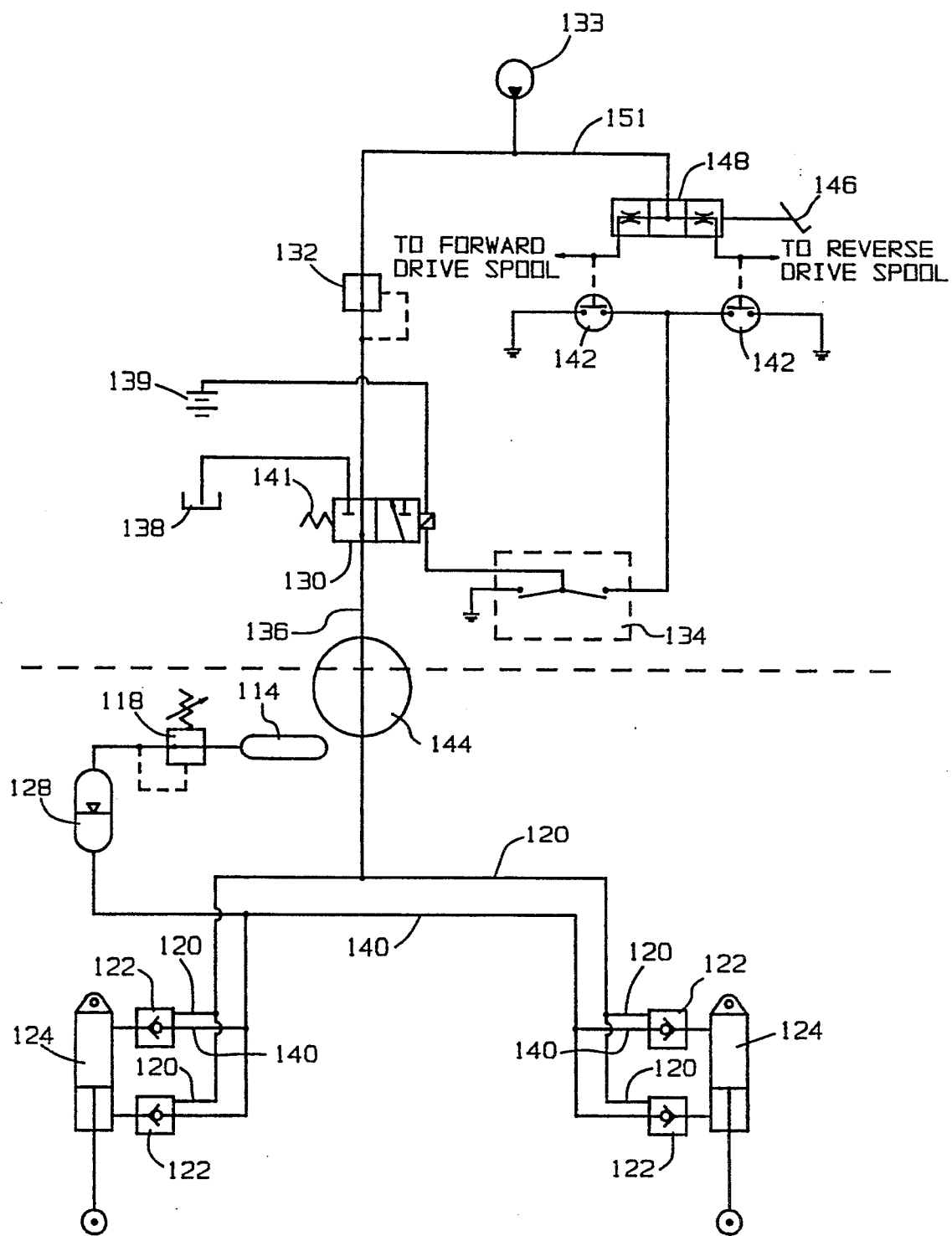
FIG. 5 is a schematic view of the components of a stabilizing mechanism that is an alternative embodiment to that shown in FIGS. 1-4, and particularly showing the axle locked relative to the frame.
Figure 6:
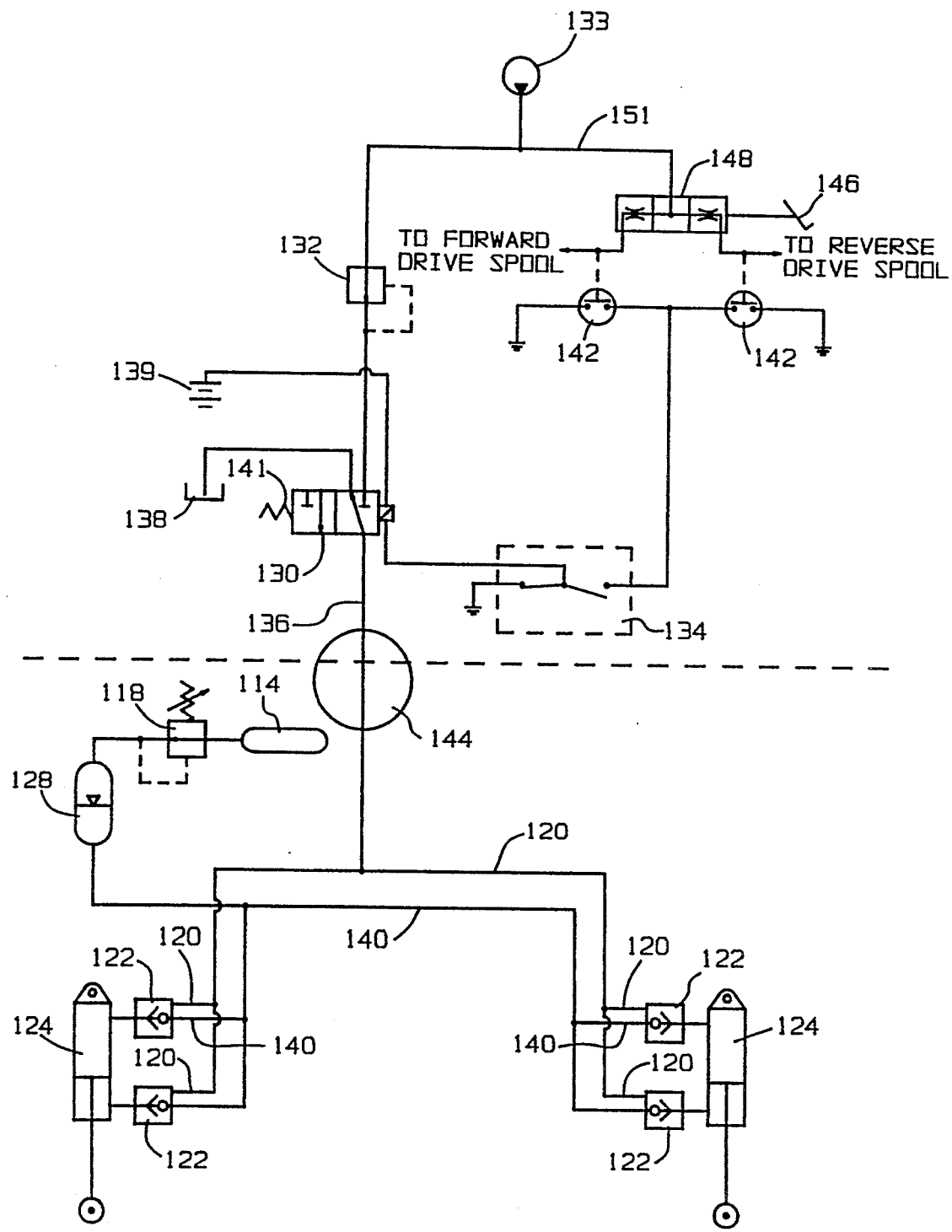
FIG. 6 is a view of the machine of FIG. 5, particularly showing the axle being free to move relative to the frame.
Figure 7:
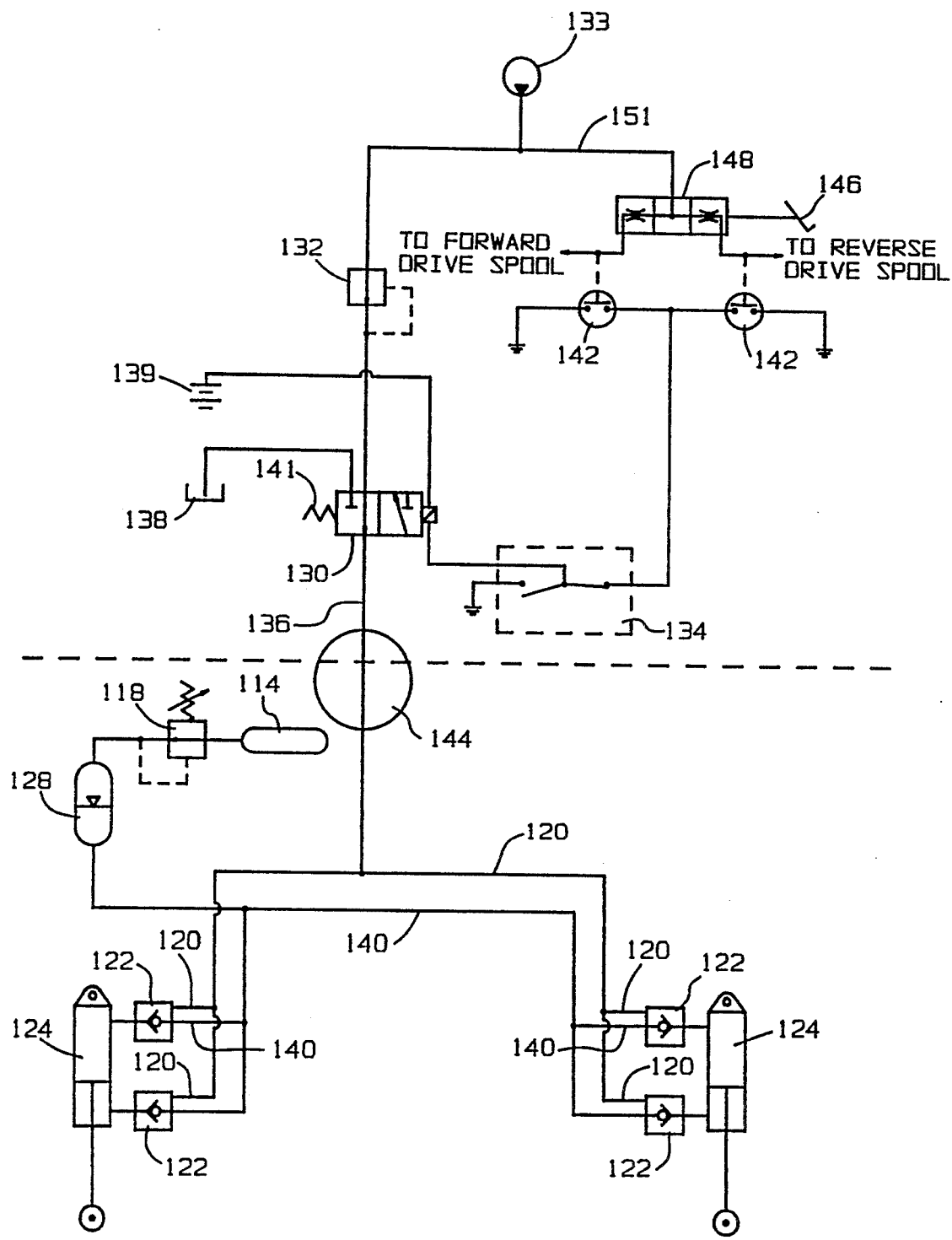
FIG. 7 is a view of the machine of FIG. 5, particularly showing the axle being locked relative to the frame while the machine is operating in its automatic mode.

FIGS. 5-7 illustrate an alternative embodiment to the device shown in FIGS. 1-4. In particular, the alternative embodiment utilizes a hydraulic signal instead of a pneumatic signal to lock the axle in a fixed position relative to the frame. In this embodiment, the upperstructure cab of the mobile material handling machine includes an operator-actuated electrical toggle switch having one of three positions. The "LOCKED" position corresponds to FIG. 5. Selection of this mode allows pick and carry of the raised lift capacity over a short distance. The "FLOAT" position corresponds to FIG. 6. Selection of this mode enables the axle to "float" relative to the frame until either the "AUTO" or "LOCKED" position is selected. The "AUTO" position corresponds to FIG. 7. This mode locks the axle whenever the upper engine is operating. Depressing the travel pedal automatically releases the axle and permits the axle to "float" to match the contour of the ground when the machine is repositioned.

In the embodiment shown in FIGS. 5-7, check valves 122 are operated by an independent hydraulic system which is operational only while the upper engine is operating. Therefore, the axle lockout system can only be controlled from the upper cab with the upper engine in operation. The front axle is "unlocked" when the upper engine is turned off, and the front axle suspension is free to float when the carrier is driven from the lower cab.

Referring to FIG. 5, cylinders 124 are rigidly connected to the vehicle frame while the upper engine is running. Hydraulic control pressure is supplied to pilot-to-close check valves 122, preferably having 69:1 pilot ratio and hydraulic assisted spring return, via pilot lines 120, hydraulic swivel 144, solenoid control valve 130, pressure reducing valve 132, preferably set about 150 psi, and a remote hydraulic control pressure source 133 located in the upper assembly. The hydraulic assisted spring return generally comprises an internal passage drilled in the pilot-to-close check valve 122 connecting the spring chamber side of its pilot section to the air charged hydraulic reservoir 128, thus allowing the pressure in reservoir 128 to assist the spring returning the pilot-to-close check valve 122 to the open position.

The lock-out device shown in FIG. 5 is actuated because switch 134 is open so that no electrical signal is communicated to solenoid valve 130. As a result, the spool of valve 130 is positioned to prevent fluid communication between hydraulic line 136 and hydraulic reservoir 138. An air reservoir 114 at about 100 psi supplies pressurized air through a pressure reducing valve 118 to an air charged hydraulic reservoir 128 (preferably at about 50 psi), which ensures that lines 140 and cylinders 124 remain full of oil.

During vehicle transport, the upper engine is off. Therefore, there is no hydraulic pressure signal sent from source 133 to check valves 122. In the transport mode, the single pole/double throw toggle switch 134 is in its closed position as shown in FIG. 6 to complete the electrical circuit on solenoid control valve 130, thereby shifting the spool to vent the hydraulic pressure in pilot lines 120 to reservoir 138 via swivel 144. The loss of pressure in lines 120 allows check valves 122 to open and permits hydraulic oil to return to hydraulic reservoir 128 via lines 140. The cylinders are thereby free to extend and retract allowing the axle to "float" relative to the vehicle chassis.

As shown in FIG. 7, toggle switch 134 is movable by the operator from the "LOCKED" position (FIG. 5) to the "AUTO" position. However, the front axle remains locked relative to the frame until the travel pedal is actuated. Once remote travel pedal 146 is actuated by the operator's foot, a hydraulic signal is sent from control valve 148 to shift the remote drive spool in the control valve. When either the forward or reverse drive spool is actuated, the buildup of hydraulic pressure in the line causes either of the two pressure switches 142 to close and complete the electrical circuit from the 12 volt DC battery source 139 (e.g. ignition battery) through solenoid valve 130, toggle switch 134 and pressure switch 142 to ground, thereby shifting the spool in valve 130 to the position shown in FIG. 6. The pressure in the control lines is then returned to reservoir 138, and the cylinders are "released", thereby allowing the axle to float relative to the vehicle frame.

It will be appreciated that the foregoing is presented by way of illustration only, and not by way of any limitation, and that various alternatives and modifications may be made to the illustrated embodiment without departing from the spirit and scope of the invention.

What is claimed is:

1. An apparatus for stabilizing a vehicle having a supporting frame and an axle suspended from said frame, comprising:

a plurality of hydraulic cylinders positioned on laterally opposite sides of said vehicle for connecting said supporting frame to said axle;

a hydraulic supply line extending from said cylinders to a pressurized reservoir of hydraulic fluid;

a pneumatically actuated pilot-to-open check valve positioned in said supply line to control the flow of hydraulic fluid into and out of said cylinders;

a first air supply line extending from said pilot-to-open check valve to a first pressurized air supply reservoir;

a pilot operated shuttle valve located in said first air supply line and being in one of a first valve position which closes said pilot-to-open check valve by venting said shuttle valve to the atmosphere and a second valve position, which opens said pilot-to-open check valve by connecting said pilot-to-open check valve to said pressurized air supply reservoir; and means in communication with said first air supply line for pneumatically actuating and deactuating said pilot-to-open check valve while said shuttle valve is in said first valve position, said pneumatic actuation means comprising a second pressurized air supply reservoir connected to a pneumatic valve by a second pneumatic line, said pneumatic valve being in communication with said first air supply line, wherein said pneumatic valve includes a spool which moves between a first spool position that permits a pneumatic signal to be sent to said pilot-to-open check valve to open said check valve and a second spool position that prevents said pneumatic signal from being sent to said check valve.

2. The apparatus of claim 1, wherein said pneumatic actuation means further comprises an electrical circuit comprising:

a first switch for sensing the position of a forward travel control device and a reverse travel control device;
a second switch that bypasses said first switch; and
a first solenoid valve electrically connected to said first switch and a second solenoid valve electrically connected to said second switch and further connected to said second pressurized air supply reservoir.

* * * * *